United States Patent
Chen

(10) Patent No.: US 9,577,531 B2
(45) Date of Patent: Feb. 21, 2017

(54) BUCK-BOOST CONVERTER AND CONTROL CIRCUIT THEREOF

(71) Applicant: ANPEC ELECTRONICS CORPORATION, Hsinchu (TW)

(72) Inventor: Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/885,600

(22) Filed: Oct. 16, 2015

(65) Prior Publication Data

US 2017/0005577 A1 Jan. 5, 2017

(30) Foreign Application Priority Data

Jul. 1, 2015 (TW) .............................. 104121346 A

(51) Int. Cl.
*G05F 1/24* (2006.01)
*H02M 3/158* (2006.01)

(52) U.S. Cl.
CPC .................................. *H02M 3/1582* (2013.01)

(58) Field of Classification Search
CPC ................ G05F 1/24; G05F 1/40; G05F 1/44; G05F 1/56; H02M 3/1582; H02M 3/135; H02M 3/155; H02M 3/1584; H02M 3/156; H02M 3/157
USPC ....... 323/259, 265, 271, 282, 283, 285, 344, 323/351
See application file for complete search history.

(56) References Cited

U.S. PATENT DOCUMENTS

| | | | | |
|---|---|---|---|---|
| 7,298,119 B1 * | 11/2007 | Amram Summit . | H02M 3/1582 323/225 |
| 7,466,112 B2 * | 12/2008 | Zhou | H02M 3/1582 323/225 |
| 7,504,888 B1 * | 3/2009 | Ju | H03F 1/14 330/278 |
| 7,570,033 B1 * | 8/2009 | Ju | H02M 3/1582 323/224 |
| RE41,037 E * | 12/2009 | Esteves | H02M 3/155 323/224 |
| 2006/0055384 A1 * | 3/2006 | Jordan | H02M 3/158 323/282 |
| 2007/0052395 A1 * | 3/2007 | Belch | H02M 3/1582 323/222 |

(Continued)

FOREIGN PATENT DOCUMENTS

| TW | 201112591 A1 | 4/2011 |
|---|---|---|
| TW | 201225493 A1 | 6/2012 |
| TW | 201448438 A | 12/2014 |

*Primary Examiner* — Adolf Berhane
(74) *Attorney, Agent, or Firm* — Li & Cai Intellectual Property (USA) Office

(57) ABSTRACT

A buck-boost converter and a control circuit thereof are disclosed. When an input voltage is close to an output voltage (i.e., the buck-boost converter operates in a buck-boost mode), the control circuit of the buck-boost converter generates specific switching signals. Four switches of a switching regulator are switched by the switching signals, so that the four switches are not turned-on or turned-off frequently because of the input voltage closing to the output voltage. Accordingly, the buck-boost converter and the control circuit thereof of the disclosure can reduce switch noise of the four switches and switching loss of the whole circuit, to improve conversion efficiency of the buck-boost converter.

19 Claims, 10 Drawing Sheets

(56) References Cited

U.S. PATENT DOCUMENTS

| | | | |
|---|---|---|---|
| 2008/0036419 A1* | 2/2008 | Cook | H02J 7/0031 320/104 |
| 2008/0055946 A1* | 3/2008 | Lesso | H02M 3/158 363/63 |
| 2010/0039086 A1* | 2/2010 | De Stegge | H02M 3/1582 323/282 |
| 2011/0241636 A1* | 10/2011 | Wu | H02M 3/1584 323/272 |
| 2012/0146594 A1* | 6/2012 | Kobayashi | H02M 3/1582 323/234 |
| 2012/0293254 A1* | 11/2012 | Liu | H02M 3/07 330/127 |
| 2013/0106380 A1* | 5/2013 | Marsili | H02M 3/158 323/283 |
| 2013/0141070 A1* | 6/2013 | Goessling | H02M 3/156 323/284 |
| 2014/0117951 A1* | 5/2014 | Dally | H02M 3/158 323/266 |
| 2015/0002115 A1* | 1/2015 | Shenoy | H02M 3/1584 323/271 |
| 2015/0069957 A1* | 3/2015 | Chang | H02J 7/0052 320/107 |
| 2016/0094213 A1* | 3/2016 | Liu | H02M 3/07 455/73 |
| 2016/0190926 A1* | 6/2016 | Ni | G05F 1/56 323/271 |

* cited by examiner

US 9,577,531 B2

BUCK-BOOST CONVERTER AND CONTROL CIRCUIT THEREOF

BACKGROUND

1. Technical Field

The present disclosure relates to a buck-boost converter and a control circuit thereof, in particular, to a buck-boost converter and a control circuit thereof which can reduce switching loss.

2. Description of Related Art

In a traditional buck-boost converter, a switching regulator is configured to operate among a boost mode, a buck mode, and a buck-boost mode in turn so as to convert an input voltage into a required output voltage. The switching regulator includes four power switches. When the switching regulator operates in the boost mode, only two of the four power switches are turned on alternatively. When the switching regulator operates in the buck mode, the other two power switches are turned on alternatively.

When the input voltage approximates to the output voltage, the traditional switching regulator operates in the buck-boost mode. In the buck-boost mode, when the input voltage is higher than the output voltage, the buck-boost converter operates in the buck mode; and when the input voltage is lower than the output voltage, the buck-boost converter operates in the boost mode. Due the input voltage being close to the output voltage, the four power switches are turned on or turned off alternatively and frequently, thereby increasing switching loss of the whole circuit and reducing the conversion efficiency of the buck-boost converter.

Therefore, reducing the switching loss of the whole circuit would improve the conversion efficiency of the buck-boost converter.

SUMMARY

An exemplary embodiment of the instant disclosure provides a control circuit. The control circuit is used for controlling a switching regulator of a bust-boost converter. The switching regulator has an inductor, a first switch, a second switch, a third switch, and a fourth switch. The inductor has a first end and a second end. An end of the first switch is coupled to the first end. Another end of the first switch is configured for receiving an input voltage generated from an input end. An end of the second switch is coupled to the first end. Another end of the second switch is coupled to ground. An end of the third switch is coupled to the second end. Another end of the third switch is coupled to ground. An end of the fourth switch is coupled to the second end. Another end of the fourth switch is configured for transmitting an output voltage to an output end. The control circuit includes a feedback compensator, a determining element, a mode selection element, a first controller, a second controller, and a driving element. The feedback compensator is coupled between the fourth switch and the output end, detects the output voltage, and generates a compensation signal indicating the output voltage. The determining element is coupled to the feedback compensator. The determining element is configured for receiving the compensation signal and a current signal flowing through the inductor, and determines whether the current signal is lower than the compensation signal. When the current signal is lower than the compensation signal, the determining element generates a start signal. The mode selection element is configured for receiving the input voltage and the output voltage. When a voltage difference between the input voltage and the output voltage is less than or equal to a predefined voltage, the mode selection element generates a buck-boost mode. The first controller is coupled to the determining element and the mode selection element. The first controller generates a first signal with high level for a first predefined time according to the start signal in the buck-boost mode, and generates the first signal with low level after the first predefined time. The second controller is coupled to the determining element and the mode selection element. The second controller generates a second signal with high level for a second predefined time according to the start signal in the buck-boost mode, and generates the second signal with low level after the second predefined time. The first predefined time is more than the second predefined time. The driving element is coupled to the mode selection element, the first controller, and the second controller. The driving element is configured for turning on the first switch according to the first signal with high level and turning off the first switch according to the first signal with low level in the buck-boost mode. The driving element is configured for turning on the third switch according to the second signal with high level and turning off the third switch according to the second signal with low level in the buck-boost mode. The first switch and the second switch are reversely switched, and the third switch and the fourth switch are reversely switched.

Another exemplary embodiment of the instant disclosure provides a control circuit. The control circuit is used for controlling a switching regulator of a buck-boost converter. The switching regulator has an inductor, a first switch, a second switch, a third switch, and a fourth switch. The inductor has a first end and a second end. An end of the first switch is coupled to the first end. Another end of the first switch is configured for receiving an input voltage generated from an input end. An end of the second switch is coupled to the first end. Another end of the second switch is coupled to ground. An end of the third switch is coupled to the second end. Another end of the third switch is coupled to ground. An end of the fourth switch is coupled to the second end. Another end of the fourth switch is configured for transmitting an output voltage to an output end. The control circuit includes a feedback compensator, a determining element, a mode selection element, a first controller, a second controller, and a driving element. The feedback compensator is coupled between the fourth switch and the output end. The feedback compensator is configured for detecting the output voltage and generating a compensation signal indicating the output voltage. The determining element is coupled to the feedback compensator. The determining element receives the compensation signal and a current signal flowing through the inductor, and determines whether the current signal is higher than the compensation signal. When the current signal is higher than the compensation signal, the determining element generates a start signal. The mode selection element is configured for receiving the input voltage and the output voltage. When a voltage difference between the input voltage and the output voltage is less than or equal to a predefined voltage, the mode selection element generates a buck-boost mode. The first controller is coupled to the determining element and the mode selection element. The first controller generates a first signal with low level for a first predefined time according to the start signal in the buck-boost mode, and generates the first signal with high level after the first predefined time. The second controller is coupled to the determining element and the mode selection element. The second controller generates a second signal with low level for a second predefined time according to the start signal in the buck-boost mode, and generates the second signal with high level after the second predefined time. The first predefined time is less than the second predefined time. The driving element is coupled to the mode selection element, the first controller, and the second controller. The driving element is configured for turning off the first switch according to the first signal with low level and turning on the first switch according to the first signal with high level in the buck-boost mode. The driving element is configured for turning off the third switch according to the second signal with low level and turning on the third switch according to the second signal with high level in the buck-boost mode. The first switch and the second switch are reversely switched, and the third switch and the fourth switch are reversely switched.

An exemplary embodiment of the instant disclosure provides a buck-boost converter. The buck-boost converter includes a switching regulator, and the control circuit of the aforementioned exemplary embodiments. The switching regulator includes an inductor, a first switch, a second switch, a third switch, and a fourth switch. The inductor has a first end and a second end. An end of the first switch is coupled to the first end, and another end of the first switch is configured for receiving an input voltage generated from an input end. An end of the second switch is coupled to the first end, and another end of the second switch is coupled to ground. An end of the third switch is coupled to the second end, and another end of the third switch is coupled to ground. An end of the fourth switch is coupled to the second end, and another end of the fourth switch is configured for transmitting an output voltage to an output end.

To sum up, the exemplary embodiments of the instant disclosure provide a buck-boost converter and a control circuit thereof. When the input voltage is close to the output voltage (i.e., the buck-boost converter operates in a buck-boost mode), the control circuit of the buck-boost converter generates specific switching signals. Four switches of the switching regulator are switched by the switching signals, so that the four switches are not turned-on or turned-off frequently because of the input voltage closing in on the output voltage. Accordingly, the buck-boost converter and the control circuit thereof can reduce switch noise of the four switches and switching loss of the whole circuit, to improve conversion efficiency of the buck-boost converter.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
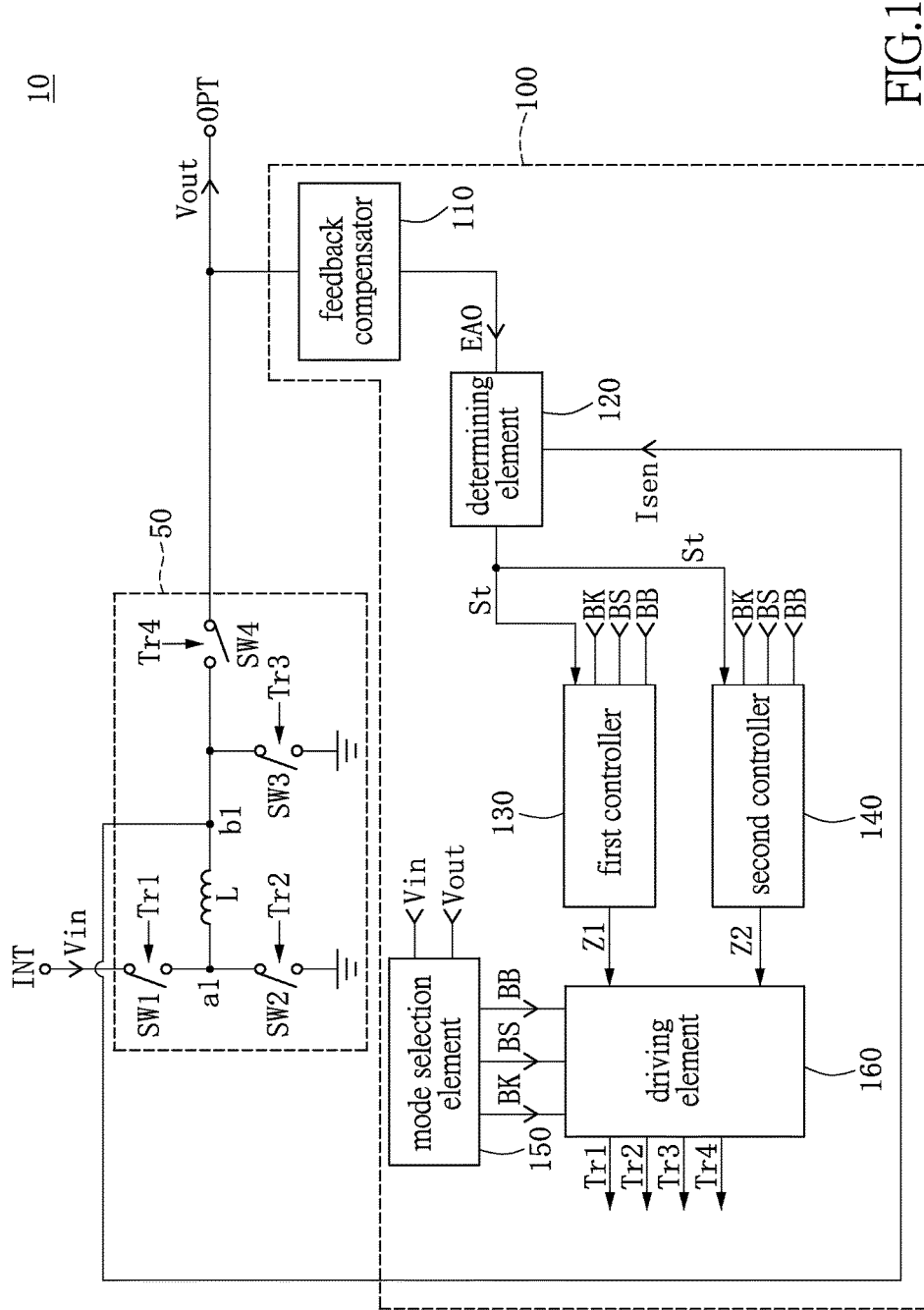
FIG. 1 shows a block diagram of a buck-boost converter according to an exemplary embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a buck-boost converter and a control circuit thereof. When the input voltage is close to the output voltage (i.e., the buck-boost converter operates in a buck-boost mode), a first controller and a second controller of the control circuit respectively generate a first signal and a second signal of a fixed time accordingly to the start signal. In the buck-boost mode, the first signal and the second signal have different fixed times, so that the driving element generates specific switching signals according to the first signal and the second signal. Four switches of the switching regulator are switched by the switching signals, so that the four switches are not turned-on or turned-off frequently because of the input voltage closing in on the output voltage. Accordingly, the buck-boost converter may reduce switch noise and switching loss of the whole circuit, to improve conversion efficiency of the buck-boost converter. The buck-boost converter and the control circuit thereof provided in the exemplary embodiment of the instant disclosure are described in the following paragraph.

Firstly, please refer to FIG. 1, which shows a block diagram of a buck-boost converter according to an exemplary embodiment of the instant disclosure. As shown in FIG. 1, the buck-boost converter 10 includes a switching regulator 50 and a control circuit 100. The switching regulator 50 includes an inductor L, a first switch SW1, a second switch SW2, a third switch SW3, and a fourth switch SW4. The inductor L has a first end a1 and a second end b1. An end of the first switch SW1 is coupled to the first end a1. Another end of the first switch SW1 receives an input voltage generated from an input end INT. An end of the second switch SW2 is coupled to the first end a1, and another end of it is coupled to ground. An end of the third switch SW3 is coupled to the second end b1, and another end of it is coupled to ground. An end of the fourth switch SW4 is coupled to the second end b1, and another end of it transmits an output voltage Vout to an output end OPT.

The first switch SW1, the second switch SW2, the third switch SW3, and the fourth switch SW4 are respectively turned on or turned off according to the switching signal Tr1, Tr2, Tr3, and Tr4, to operate among a boost mode, a buck mode, and a buck-boost mode in turn. The boost mode, the buck mode, and the buck-boost mode will be described in a later embodiment, and further description here is omitted. In the instant disclosure, the first switch SW1, the second switch SW2, the third switch SW3, and the fourth switch SW4 are transistor switches, and can be other type of switches. The instant disclosure is not limited thereto.

Figure 2:
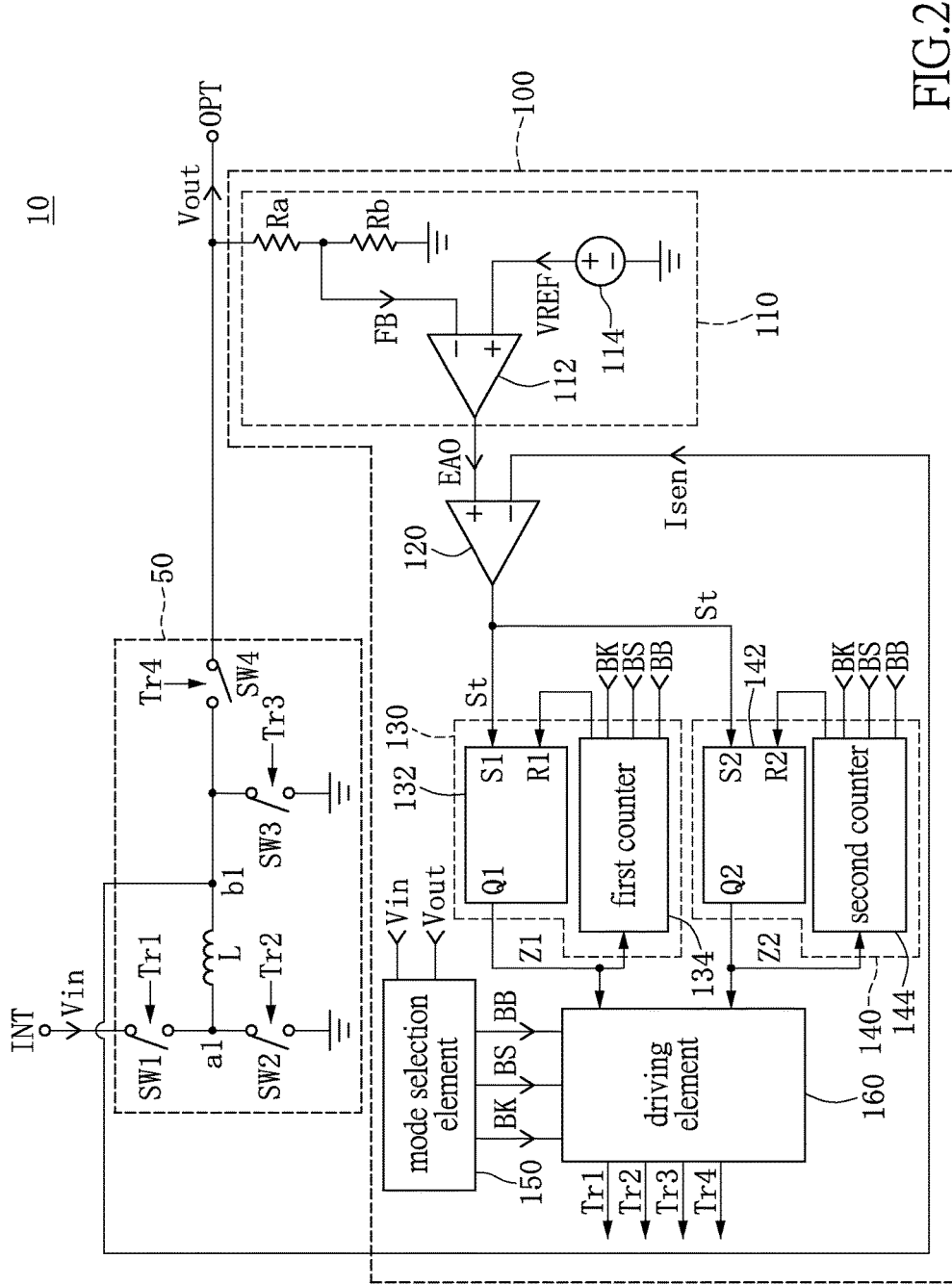
FIG. 2 shows a block diagram of a control circuit according to an exemplary embodiment of the instant disclosure.

Please refer to FIG. 1 in conjunction with FIG. 2. FIG. 2 shows a block diagram of a control circuit according to an exemplary embodiment of the instant disclosure. The control circuit 100 is coupled to the switching regulator 50. The control circuit 100 turns on or turns off the first switch SW1, the second switch SW2, the third switch SW3, and the fourth switch SW4 in the boost mode, the buck mode, and the buck-boost mode, so as to convert the input voltage Vin into the required output voltage Vout. The control circuit 100 includes a feedback compensator 110, a determining element 120, a first controller 130, a second controller 140, a mode selection element 150, and a driving element 160.

The feedback compensator 110 is coupled between the fourth switch SW4 and the output end OPT, to detect the output voltage Vout and to generate a compensation signal EAO indicating the output voltage Vout. In the instant disclosure, the feedback compensator 110 includes a first resistor Ra, a second resistor Rb, and an operational amplifier (OPA) 112. An end of the first resistor Ra is electrically connected to the output end OPT. Another end of the first resistor Ra is electrically connected to an end of the second resistor Rb. Another end of the second resistor Rb is connected to ground. A negative end of the OPA 112 is electrically connected between the first resistor Ra and the second resistor Rb, to receive a feedback signal FB according to the output voltage Vout. A positive end of the OPA 112 is electrically connected to a voltage source 114, to receive a reference voltage VREF generated from the voltage source 114. The OPA 112 generates the compensation signal EAO indicating the output voltage Vout according to the feedback signal FB and the reference voltage VREF.

The determining element 120 is coupled to the feedback compensator 110 and receives the compensation signal EAO and a current signal Isen flowing through the inductor L. In the instant disclosure, the determining element 120 is electrically connected between the inductor L and the fourth switch SW4 (i.e., the second end b1 of the inductor L), to detect the current signal Isen flowing through the inductor L. The determining element 120 can be electrically connected to an element, which can detect the current signal Isen flowing through the inductor L. The instant disclosure is not limited thereto.

The determining element 120 further determines whether the current signal Isen is lower than the compensation signal EAO. When the determining element 120 determines that the current signal Isen is lower than the compensation signal EAO, the determining element 120 generates a start signal St; otherwise, the determining element 120 does not generate the start signal St. In the instant disclosure, the determining element 120 is a comparator. The comparator has an input positive end and an input negative end. The input positive end receives the compensation signal EAO, the input negative end receives the current signal Isen. The comparator compares the compensation signal EAO with the current signal Isen, to generate the start signal St while the current signal Isen is lower than the compensation signal EAO. It indicates that the present current signal Isen flowing through the inductor L is too low. The current signal Isen needs to be increased, to convert the current signal Isen into the required output voltage Vout. When the current signal Isen is higher than the compensation signal EAO, the comparator does not generate the start signal St. It indicates that the present current signal Isen flowing through the inductor is enough to convert into the required output voltage Vout, and the current signal Isen does not need to be increased.

The aforementioned feedback compensator 110 can use other elements to generate the compensation signal EAO indicating the output voltage Vout. The determining element 120 can use other elements to generate the start signal St. The instant disclosure is not limited thereto.

The mode selection element 150 receives the input voltage Vin and the output voltage Vout. When the input voltage Vin is more than the output voltage Vout, and the voltage difference between them is more than a predefined voltage, the mode selection element 150 generates a buck mode signal BK indicating the buck mode. When the input voltage Vin is less than the output voltage Vout, and the voltage difference between them is more than the predefined voltage, the mode selection element 150 generates a boost mode signal BS indicating the boost mode. When the voltage difference between the input voltage Vin and the output voltage Vout is less than or equal to the predefined, the mode selection element 150 generates a buck-boost mode signal BB indicating the buck-boost mode.

For example, if the mode selection element 150 determines that the input voltage Vin is more than the output voltage Vout, and the voltage difference between them is more than 100 mV, it generates the buck mode signal BK with high level. If the mode selection element 150 determines that the input voltage Vin is less than the output voltage Vout, and the voltage difference between them is more than 100 mV, it generates the boost mode signal BS with high level. If the mode selection element 150 determines that the voltage difference between the input voltage Vin and the output voltage Vout is less than or equal to 100 mV, it generates the buck-boost mode signal BB with high level. The predefined voltage can be configured by the actual condition. The mode selection element 150 can be switched by other signals, to control the control circuit 100 to operate in the buck mode, boost mode, or buck-boost mode. The instant disclosure is not limited thereto.

The first controller 130 is coupled to the determining element 120 and the mode selection element 150, to generate the first signal Z1 to the driving element 160 according to the buck mode signal BK, boost mode signal BS, the buck-boost signal BB, and the start signal St. Similarly, the second controller 140 is coupled to the determining element 120 and the mode selection element 150, to generate the second signal Z2 to the driving element 160 according to the buck mode signal BK, the boost mode signal BS, the buck-boost mode signal BB, and the start signal St. The driving element 160 is coupled to the mode selection element 150, the first controller 130, and the second controller 140, to generate the switching signals Tr1, Tr2, Tr3, and Tr4 according to the buck mode signal BK, the boost mode signal BS, the buck-boost mode signal BB, the first signal Z1, and the second signal Z2. Then the driving element 160 turns on or turns off the first switch SW1, the second switch SW2, the third switch SW3, and the fourth switch SW4 according to the switching signals Tr1, Tr2, Tr3, and Tr4. The control circuit 100 operating in the buck mode, the boost mode, or the buck-boost mode is described in the following paragraph.

Figure 3A:
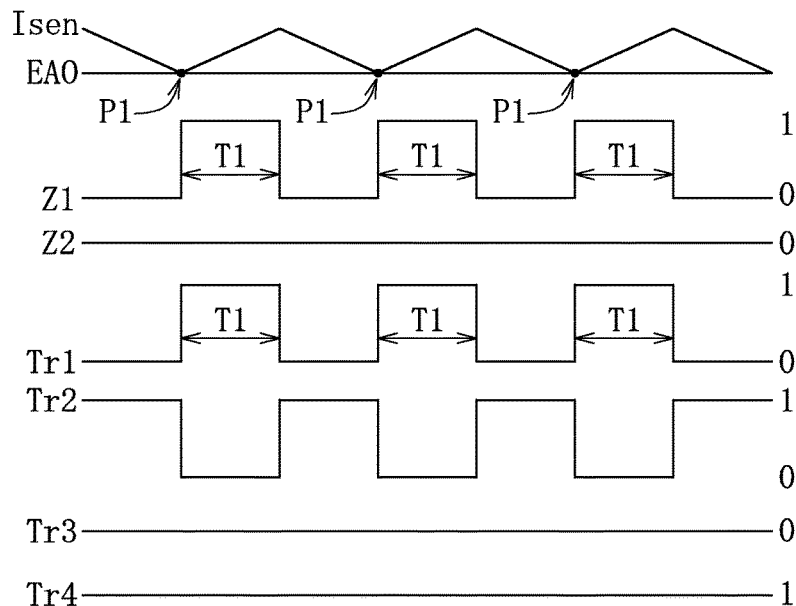
FIGS. 3A-3D show a wave diagram of a control circuit according to another exemplary embodiment of the instant disclosure.

Please refer to FIGS. 3A-3D, which show a wave diagram of the current signal and the switching signals being in the buck mode, the boost mode, or the buck-boost mode. FIG. 3A shows the condition of the control circuit 100 operating in the buck mode. Therefore, when the control circuit 100 operates in the buck mode, the first controller 130 generates the first signal Z1 with high level for a fixed time T1 according to the generated start signal St (i.e., when the current signal Isen is lower than the compensation signal EAO, e.g., three ends P1 shown in FIG. 3A). Then the first controller 130 generates the first signal Z1 with low level after the fixed time T1. The second controller 140 keeps generating the second signal Z2 with low level because of the control circuit 100 operating in the buck mode.

In the instant disclosure, the first controller 130 includes a first SR flip-flop 132 and a first counter 134. The first SR flip-flop 132 has a first set end S1, a first reset end R1, and a first output end Q1. The first set end S1 receives the start signal St, and the first output end Q1 generates the first signal Z1 with high level according to the start signal St. The first counter 134 is electrically connected among the driving element 160, the mode selection element 150, and the first reset end R1. When the first counter 134 determines that the first signal Z1 is in a positive edge trigger, the first counter 134 counts the fixed time T1, and resets the first signal Z1 after the fixed time T1, to generate the first signal Z1 with low level to the driving element 160. The first controller 130 can be composed of other circuits, and the instant disclosure is not limited thereto.

Next, the driving element 160 generates the switching signal Tr1 with high level and the switching signal Tr2 with low level for the fixed time T1 according to the first signal Z1 with high level, so as to turn on the first switch SW1 and turn off the second switch SW2 for the fixed time T1. This means that the first switch SW1 and the second switch SW2 are reversely switched. In addition, the driving element 160 keeps generating the switching signal Tr3 with low level and the switching signal Tr4 with high level according to the second signal Z2 with low level, so as to keep turning off the third switch SW3 and turning on the fourth switch SW4. This means that the third switch SW3 and the fourth switch SW4 are reversely switched.

During the fixed time T1, the first switch SW1 and the fourth switch SW4 are turned on, and the second switch SW2 and the third switch SW3 are turned off, so as to gradually increase the current signal Isen. After the fixed time T1, the second switch SW2 and the fourth switch SW4 are turned on, and the first switch SW1 and the third switch SW3 are turned off, so as to gradually decrease the current signal Isen. Accordingly, the buck-boost converter 10 can supply enough current signal Isen in the buck mode, to convert the input voltage Vin into the required output voltage Vout.

Figure 3B:
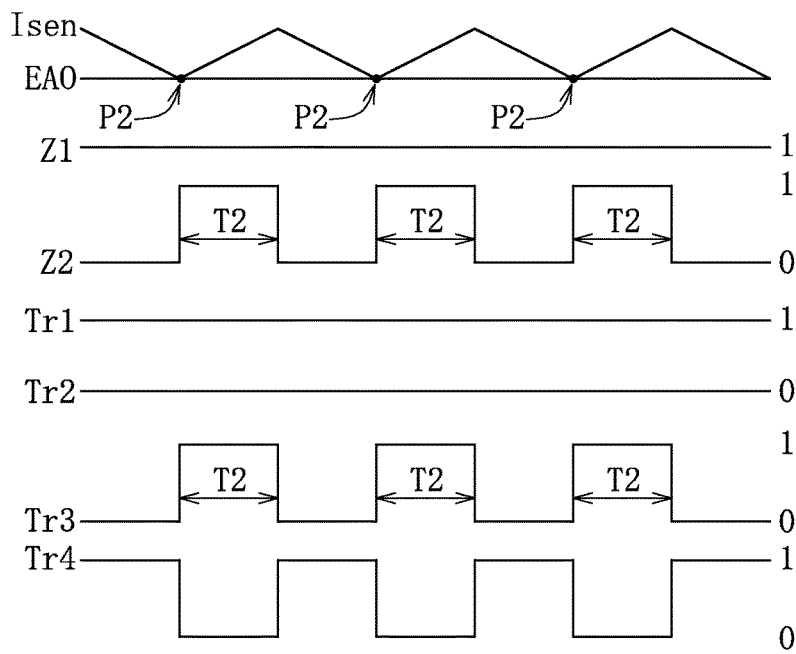

FIG. 3B shows the condition of the control circuit 100 operating in the boost mode. Therefore, when the control circuit 100 operates in the boost mode, the second controller 140 generates the second signal Z2 with high level for a fixed time T2 according to the generated start signal St (i.e., when the current signal Isen is lower than the compensation signal EAO, e.g., three ends P2 shown in FIG. 3B). Then the second controller 140 generates the second signal Z2 with low level after the fixed time T2. The first controller 130 keeps generating the first signal Z1 with high level because of the control circuit 100 operating in the boost mode. Next, the driving element 160 keeps generating the switching signal Tr1 with high level and the switching signal Tr2 with low level according to the first signal Z1 with high level, so as to keep turning on the first switch SW1 and turning off the second switch SW2. This means that the first switch SW1 and the second switch SW2 are reversely switched. In addition, the driving element 160 keeps generating the switching signal Tr3 with high level and the switching signal Tr4 with low level for the fixed time T2 according to the second signal Z2 with high level, so as to turn on the third switch SW3 and turn off the fourth switch SW4 for the fixed time T2. This means that the third switch SW3 and the fourth switch SW4 are reversely switched.

In the instant disclosure, the second controller 140 includes a second SR flip-flop 142 and a second counter 144. The second SR flip-flop 142 has a second set end S2, a second reset end R2, and a second output end Q2. The second set end S2 receives the start signal St, and the second output end Q2 generates the second signal Z2 with high level according to the start signal St. The second counter 144 is electrically connected among the driving element 160, the mode selection element 150, and the second reset end R2. When the second counter 144 determines that the second signal Z2 is in the positive edge trigger, it counts the fixed time T2, and resets the second signal Z2 after the fixed time T2, to generate the second signal Z2 with low level to the driving element 160. The second controller 140 can be composed of other circuits, and the instant disclosure is not limited thereto.

During the fixed time T2, the first switch SW1 and the third switch SW3 are turned on, and the second switch SW2 and the fourth switch SW4 are turned off, so as to gradually increase the current signal Isen. After the fixed time T2, the first switch SW1 and the fourth switch SW4 are turned on, and the second switch SW2 and the third switch SW3 are turned off, so as to gradually decrease the current signal Isen. Accordingly, the buck-boost converter 10 can supply enough current signal Isen in the boost mode, to convert the input voltage Vin into the required output voltage Vout.

Figure 3C:
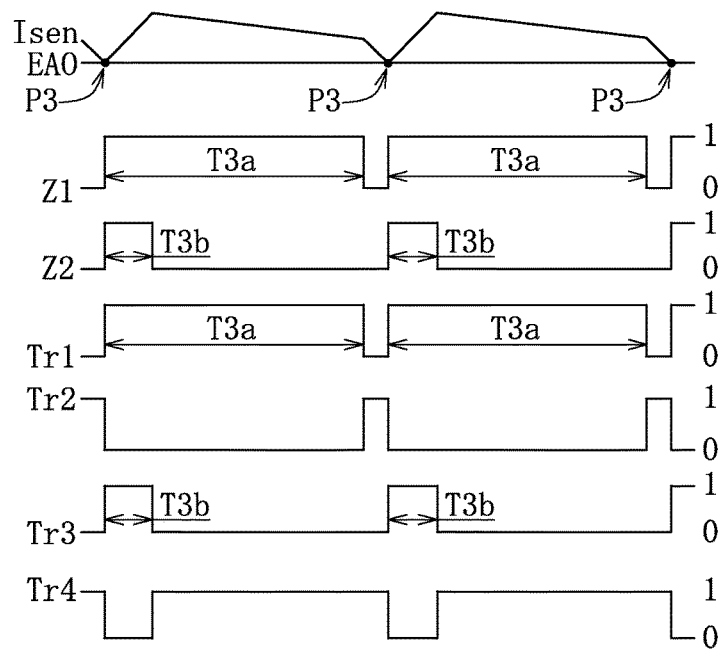

FIG. 3C shows the condition of the control circuit 100 operating in the buck-boost mode and the input voltage Vin being less than the output voltage Vout. Therefore, when the control circuit 100 operates in the buck-boost mode and the input voltage Vin is less than the output voltage Vout, the first controller 130 generates the first signal Z1 with high level for a first predefined time T3a according to the generated start signal St (i.e., when the current signal Isen is lower than the compensation signal EAO, e.g., three ends P3 shown in FIG. 3C). Then the first controller 130 generates the first signal Z1 with low level after the first predefined time T3a. The second controller 140 generates the second signal Z2 with high level for a second predefined time T3b according to the generated start signal St. Then the second controller 140 generates the second signal Z2 with low level after the second predefined time T3b.

Next, the driving element 160 generates the switching signal Tr1 with high level and the switching signal Tr2 with low level for the first predefined time T3a according to the first signal Z1 with high level, so as to turn on the first switch SW1 and turn off the second switch SW2 for the first predefined time T3a. This means that the first switch SW1 and the second switch SW2 are reversely switched. In addition, the driving element 160 generates the switching signal Tr3 with high level and the switching signal Tr4 with low level for the second predefined time T3b according to the second signal S2 with high level, so as to turn on the third switch SW3 and turn off the fourth switch SW4 for the second predefined time T3b. This means that the third switch SW3 and the fourth switch SW4 are reversely switched.

It is worth to note that the first predefined time T3a is more than the second predefined time T3b, and the first predefined time T3a is preferably more than three times as long as the second predefined time T3b. Therefore, during the intersection of the first predefined time T3a and the second predefined time T3b, the first switch SW1 and the third switch SW3 are turned on, and the second switch SW2 and the fourth switch SW4 are turned off, so that the current signal Isen increases quickly because the voltage difference between the first end a1 and the second end b1 of the inductor L becomes greater (i.e., the voltage difference is the input voltage Vin).

During the first predefined time T3a and after finishing the second predefined time T3b, the first switch SW1 and the fourth switch SW4 are turned on, and the second switch SW2 and the third switch SW3 are turned off. At present, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen decreases gradually.

After finishing the first predefined time T3a and the second predefined time T3b, the second switch SW2 and the fourth switch SW4 are turned on, and the first switch SW1 and the third switch SW3 are turned off. At this time, because the voltage difference between the first end a1 and the second end b1 of the inductor L becomes greater (i.e., the voltage difference is the output voltage Vout), the current signal Isen decreases quickly until the current signal Isen is lower than the compensation signal EAO. After the current signal Isen is lower than the compensation signal EAO, the turned-on and turned-off conditions among the first switch SW1, the second switch SW2, the third switch SW3, and the fourth switch SW4 return to the intersection period of the first predefined time T3a and the second predefined time T3b, to increase the current signal Isen again.

Figure 3D:
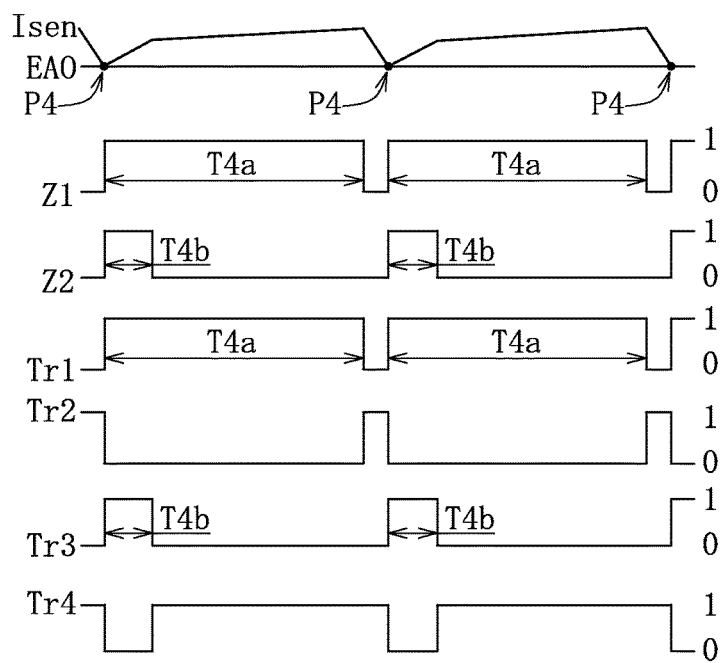

FIG. 3D shows the condition of the control circuit 100 operating in the buck-boost mode and the input voltage Vin being more than the output voltage Vout. Therefore, when the control circuit 100 operates in the buck-boost mode and the input voltage Vin is more than the output voltage Vout, the first controller 130 generates the first signal Z1 with high level for a first predefined time T4a according to the generated start signal St (i.e., when the current signal Isen is lower than the compensation signal EAO, e.g., the three ends P4 shown in FIG. 3D). Then the first controller 130 generates the first signal Z1 with low level after the first predefined time T4a. Similarly, the second controller 140 generates the second signal Z2 with high level for a second predefined time T4b according to the generated start signal St. Then the second controller 140 generates the second signal Z2 with low level after the second predefined time T4b.

Next, the driving element 160 generates the switching signal Tr1 with high level and the switching signal Tr2 with low level for the first predefined time T4a according to the first signal Z1 with high level, so as to turn on the first switch SW1 and turn off the second switch SW2 for the first predefined time T4a. This means that the first switch SW1 and the second switch SW2 are reversely switched. In addition, the driving element 160 generates the switching signal Tr3 with high level and the switching signal Tr4 with low level for the second predefined time T4b according to the second signal S2 with high level, so as to turn on the third switch SW3 and turn off the fourth switch SW4 for the second predefined time T4b. This means that the third switch SW3 and the fourth switch SW4 are reversely switched.

It is worth to note that the first predefined time T4a is more than the second predefined time T4b, and the first predefined time T4a is preferably more than three times as long as the second predefined time T4b. Therefore, during the intersection of the first predefined time T4a and the second predefined time T4b, the first switch SW1 and the third switch SW3 are turned on, and the second switch SW2 and the fourth switch SW4 are turned off, so that the current signal Isen increases quickly because the voltage difference between the first end a1 and the second end b1 of the inductor L becomes greater (i.e., the voltage difference is the input voltage Vin).

During the first predefined time T4a and after finishing the second predefined time T4b, the first switch SW1 and the fourth switch SW4 are turned on, and the second switch SW2 and the third switch SW3 are turned off. At present, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen increases gradually.

After finishing the first predefined time T4a and the second predefined time T4b, the second switch SW2 and the fourth switch SW4 are turned on, and the first switch SW1 and the third switch SW3 are turned off. At present, because the voltage difference between the first end a1 and the second end b1 of the inductor L becomes greater (i.e., the voltage difference is the output voltage Vout), the current signal Isen decreases quickly until the current signal Isen is lower than the compensation signal EAO. After the current signal Isen is lower than the compensation signal EAO, the turned-on and turned-off conditions among the first switch SW1, the second switch SW2, the third switch SW3, and the fourth switch SW4 return to the intersection period of the first predefined time T4a and the second predefined time T4b, to increase the current signal Isen again.

As in the aforementioned description, in the buck-boost mode, whether or not the input voltage Vin is more than, equal to, or less than the output voltage Vout, the first controller 130 and the second controller 140 of the control circuit 100 respectively generate the first signal Z1 for the first predefined time (e.g., the first predefined time T3a shown in FIG. 3C and the first predefined time T4a shown in FIG. 3D) and the second signal Z2 for the second predefined time (e.g., the second predefined time T3b shown in FIG. 3C and the second predefined time T4b shown in FIG. 3D) according to the start signal St. The first predefined time is more than the second predefined time, so that the turned-on times of the first switch SW1 and the third switch SW3 are different. Therefore, when the current signal Isen flowing through the inductor L is too low (i.e., the current signal Isen is lower than the compensation signal EAO), the control circuit 100 switches the turned-on and turned-off conditions among the first switch SW1, the second switch SW2, the third switch SW3, and the fourth switch SW4. Therefore, the current signal Isen quickly increases (i.e., during the intersection of the first predefined time and the second predefined time). Then the current signal Isen gradually increases or decreases according to the voltage difference between the input voltage Vin and the output voltage Vout (i.e., during the first predefined time and after finishing the second predefined time). Lastly, the current signal Isen quickly decreases until the current signal Isen is lower than the compensation signal EAO (i.e., after finishing the first predefined time T4a and the second predefined time T4b).

Accordingly, the control circuit 100 can generate the fixed turned-on times in the buck mode and the boost mode, and can generate the different turned-on times in the buck-boost mode. Therefore, in the process of switching the four switches, the control circuit 100 has a longer time (i.e., during the first predefined time and after finishing the second predefined time) to gradually charge or discharge the inductor, so that the four switches need not to be turned on or turned off frequently. Therefore, the four switches do not generate many switch noises and switching loss.

Figure 4:
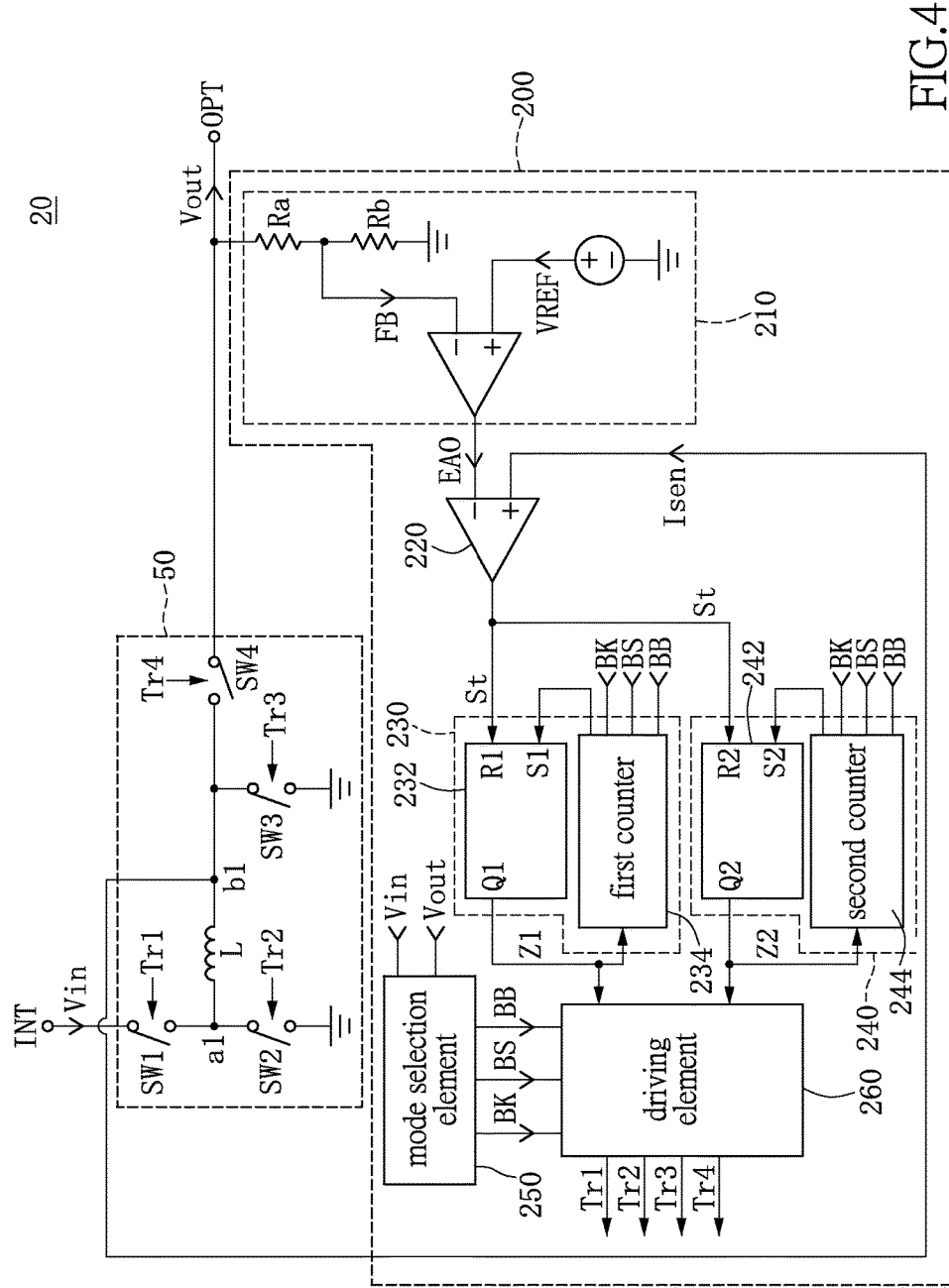
FIG. 4 shows a block diagram of a control circuit according to another exemplary embodiment of the instant disclosure.

Next, please refer to FIG. 4, which shows a block diagram of a control circuit according to another exemplary embodiment of the instant disclosure. As shown in FIG. 4, the buck-boost converter 20 includes a switching regulator 50 and a control circuit 200. The control circuit 200 includes a feedback compensator 210, a determining element 220, a first controller 230, a second controller 240, a mode selection element 250, and a driving element 260. With respect to internal components and operations of the feedback compensator 210, the mode selection element 250, and the driving element 260 are the same as that of the feedback compensator 110, the mode selection element 150, and the driving element 160, so detailed description is omitted.

In the instant disclosure, the determining element 220 is electrically connected between the inductor L and the fourth switch SW4, to detect the current signal Isen flowing through the inductor L. The difference between the instant embodiment and the aforementioned embodiment is that the determining element 220 determines whether the current signal Isen is higher than the compensation signal EAO. When the determining element 220 determines that the current signal Isen is higher than the compensation signal EAO, the determining element 220 generates the start signal St; otherwise, the determining element 220 does not generate the start signal St. In the instant disclosure, the determining element 220 is a comparator. The comparator has an input positive end and an input negative end. The input positive end receives the current signal Isen, the input negative end receives the compensation signal EAO. The comparator compares the current signal Isen with the compensation signal EAO, to generate the start signal St when the current signal Isen is higher than the compensation signal EAO. It indicates that the present current signal Isen flowing through the inductor L is too high. The current signal Isen needs to be decreased, to convert the current signal Isen into the required output voltage Vout. When the current signal Isen is lower than the compensation signal EAO, the comparator does not generate the start signal St. It indicates that the present current signal Isen flowing through the inductor is enough to convert into the required output voltage Vout, and the current signal Isen does not need to be decreased. The determining element 220 can use other elements, to generate the start signal St. The instant disclosure is not limited thereto.

The first controller 230 and the second controller 240 are coupled to the determining element 220 and the mode selection element 250 and respectively generate the first signal Z1 and the second signal Z2 to the driving element 260 according to the buck mode signal BK, the boost mode signal BS, the buck-boost mode signal BB, and the start signal St. The control circuit 200 operating in the buck mode, the boost mode, or the buck-boost mode is described in the following paragraph.

Figure 5A:
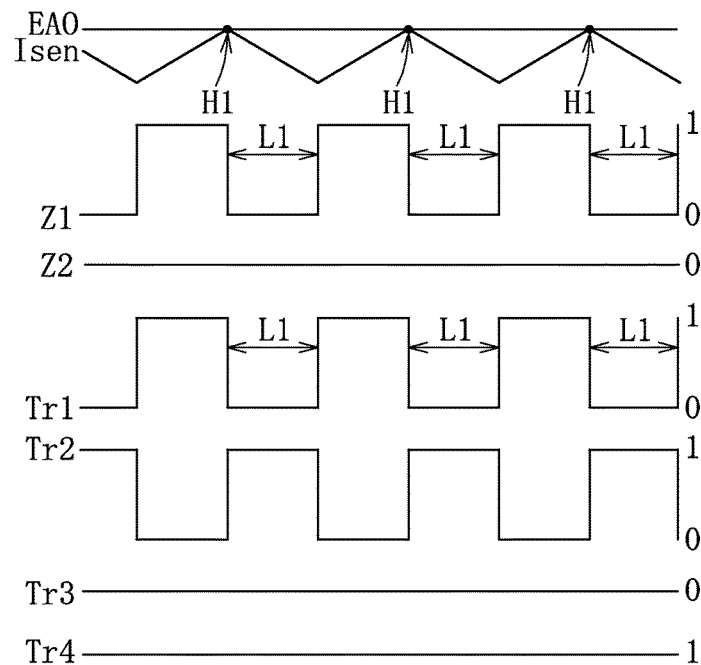
FIGS. 5A-5D show a wave diagram of a control circuit according to another exemplary embodiment of the instant disclosure.

Please refer to FIGS. 5A-5D, which show a wave diagram of the current signal and the switching signals being in the buck mode, the boost mode, or the buck-boost mode. FIG. 5A shows the condition of the control circuit 200 operating in the buck mode. Therefore, when the control circuit 200 operates in the buck mode, the first controller 230 generates the first signal Z1 with low level for a fixed time L1 according to the generated start signal St (i.e., when the current signal Isen is higher than the compensation signal EAO, e.g., three ends H1 shown in FIG. 5A). Then the first controller 230 generates the first signal Z1 with high level after the fixed time L1. The second controller 240 keeps generating the second signal Z2 with low level because of the control circuit 200 operating in the buck mode.

In the instant disclosure, the first controller 230 includes a first SR flip-flop 232 and a first counter 234. The first SR flip-flop 232 has a first reset end R1, a first set end S1, and a first output end Q1. The first reset end R1 receives the start signal St, and the first output end Q1 generates the first signal Z1 with low level according to the start signal St. The first counter 234 is electrically connected among the driving element 260, the mode selection element 250, and the first set end S1. When the first counter 234 determines that the first signal Z1 is in a negative edge trigger, the first counter 234 counts the fixed time L1, and sets the first signal Z1 after the fixed time L1, to generate the first signal Z1 with high level to the driving element 160. The first controller 230 can be composed of other circuits, and the instant disclosure is not limited thereto.

Next, the driving element 260 generates the switching signal Tr1 with low level and the switching signal Tr2 with high level for the fixed time L1 according to the first signal Z1 with low level, so as to turn off the first switch SW1 and turn on the second switch SW2 for the fixed time L1. This means that the first switch SW1 and the second switch SW2 are reversely switched. In addition, the driving element 260 keeps generating the switching signal Tr3 with low level and the switching signal Tr4 with high level according to the second signal Z2 with low level, so as to keep turning off the third switch SW3 and turning on the fourth switch SW4. This means that the third switch SW3 and the fourth switch SW4 are reversely switched.

During the fixed time L1, the first switch SW1 and the third switch SW3 are turned off, and the second switch SW2 and the fourth switch SW4 are turned on, so as to gradually decrease the current signal Isen. After the fixed time L1, the first switch SW1 and the fourth switch SW4 are turned on, and the second switch SW2 and the third switch SW3 are turned off, so as to gradually increase the current signal Isen. Accordingly, the buck-boost converter 20 can supply the enough current signal Isen in the buck mode, to convert the input voltage Vin into the required output voltage Vout.

Figure 5B:
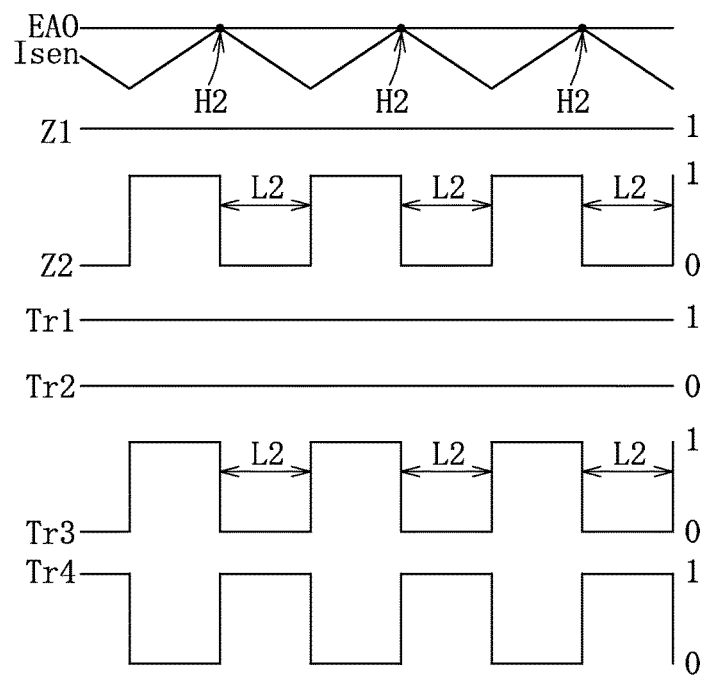

FIG. 5B shows the condition of the control circuit 200 operating in the boost mode. Therefore, when the control circuit 200 operates in the boost mode, the second controller 240 generates the second signal Z2 with low level for a fixed time L2 according to the generated start signal St (i.e., when the current signal Isen is higher than the compensation signal EAO, e.g., three ends H2 shown in FIG. 5B). Then the second controller 240 generates the second signal Z2 with high level after the fixed time L2. The first controller 230 keeps generating the first signal Z1 with high level because of the control circuit 200 operating in the boost mode. Next, the driving element 260 keeps generating the switching signal Tr1 with high level and the switching signal Tr2 with low level according to the first signal Z1 with high level, so as to keep turning on the first switch SW1 and turning off the second switch SW2. This means that the first switch SW1 and the second switch SW2 are reversely switched. In addition, the driving element 260 keeps generating the switching signal Tr3 with low level and the switching signal Tr4 with high level for the fixed time L2 according to the second signal Z2 with low level, so as to turn off the third switch SW3 and turn on the fourth switch SW4 for the fixed time L2. This means that the third switch SW3 and the fourth switch SW4 are reversely switched.

In the instant disclosure, the second controller 240 includes a second SR flip-flop 242 and a second counter 244.

The second SR flip-flop 242 has a second reset end R2, a second set end S2, and a second output end Q2. The second reset end R2 receives the start signal St, and the second output end Q2 generates the second signal Z2 with low level according to the start signal St. The second counter 244 is electrically connected among the driving element 260, the mode selection element 250, and the second set end S2. When the second counter 244 determines that the second signal Z2 is in the negative edge trigger, it counts the fixed time L2, and sets the second signal Z2 after the fixed time L2, to generate the second signal Z2 with high level to the driving element 260. The second controller 240 can be composed of other circuits, and the instant disclosure is not limited thereto.

During the fixed time L2, the first switch SW1 and the fourth switch SW4 are turned on, and the second switch SW2 and the third switch SW3 are turned off, so as to gradually decrease the current signal Isen. After the fixed time L2, the second switch SW2 and the fourth switch SW4 are turned off, and the first switch SW1 and the third switch SW3 are turned on, so as to gradually increase the current signal Isen. Accordingly, the buck-boost converter 20 can supply enough current signal Isen in the boost mode, to convert the input voltage Vin into the required output voltage Vout.

Figure 5C:
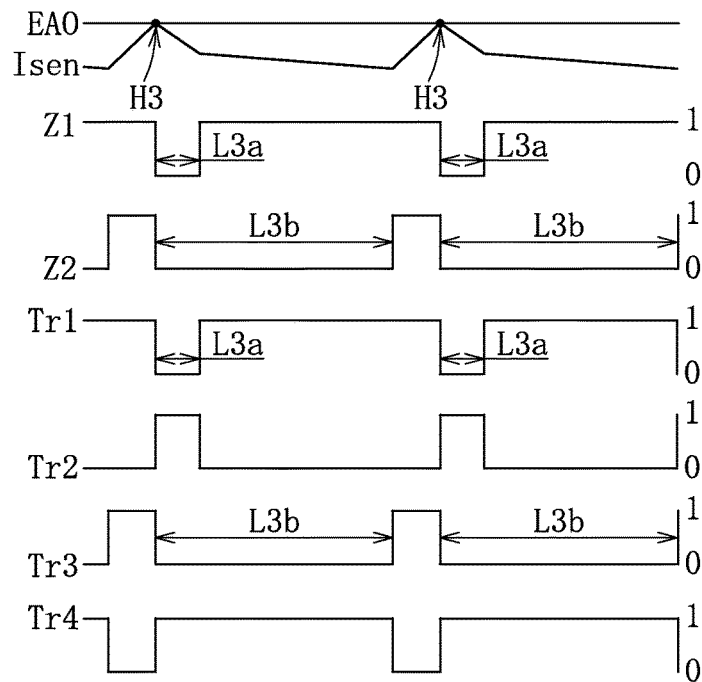

FIG. 5C shows the condition of the control circuit 200 operating in the buck-boost mode and the input voltage Vin being less than the output voltage Vout. Therefore, when the control circuit 200 operates in the buck-boost mode and the input voltage Vin is less than the output voltage Vout, the first controller 230 generates the first signal Z1 with low level for a first predefined time L3a according to the generated start signal St (i.e., when the current signal Isen is higher than the compensation signal EAO, e.g., three ends H3 shown in FIG. 5C). Then the first controller 230 generates the first signal Z1 with high level after the first predefined time L3a. The second controller 240 generates the second signal Z2 with low level for a second predefined time L3b according to the generated start signal St. Then the second controller 240 generates the second signal Z2 with high level after the second predefined time L3b.

Next, the driving element 260 generates the switching signal Tr1 with low level and the switching signal Tr2 with high level for the first predefined time L3a according to the first signal Z1 with low level, so as to turn off the first switch SW1 and turn on the second switch SW2 for the first predefined time H3a. This means that the first switch SW1 and the second switch SW2 are reversely switched. In addition, the driving element 260 generates the switching signal Tr3 with low level and the switching signal Tr4 with high level for the second predefined time L3b according to the second signal S2 with low level, so as to turn off the third switch SW3 and turn on the fourth switch SW4 for the second predefined time L3b. This means that the third switch SW3 and the fourth switch SW4 are reversely switched.

It is worth to note that the first predefined time L3a is less than the second predefined time L3b, and the second predefined time L3b is preferably more than three times as long as the first predefined time L3a. Therefore, during the intersection of the second predefined time L3b and the first predefined time L3a, the second switch SW2 and the fourth switch SW4 are turned on, and the first switch SW1 and the third switch SW3 are turned off, so that the current signal Isen decreases quickly because the voltage difference between the first end a1 and the second end b1 of the inductor L becomes greater (i.e., the voltage difference is the output voltage Vout).

During the second predefined time L3b and after finishing the first predefined time L3a, the first switch SW1 and the fourth switch SW4 are turned on, and the second switch SW2 and the third switch SW3 are turned off. At this time, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen decreases gradually.

After finishing the second predefined time L3b and the first predefined time L3a, the first switch SW1 and the third switch SW3 are turned on, and the second switch SW2 and the fourth switch SW4 are turned off. At this time, because the voltage difference between the first end a1 and the second end b1 of the inductor L becomes greater (i.e., the voltage difference is the input voltage Vin), the current signal Isen increases quickly until the current signal Isen is higher than the compensation signal EAO. After the current signal Isen is higher than the compensation signal EAO, the turned-on and turned-off conditions among the first switch SW1, the second switch SW2, the third switch SW3, and the fourth switch SW4 return to the intersection period of the second predefined time L3b and the first predefined time L3a, to decrease the current signal Isen again.

Figure 5D:
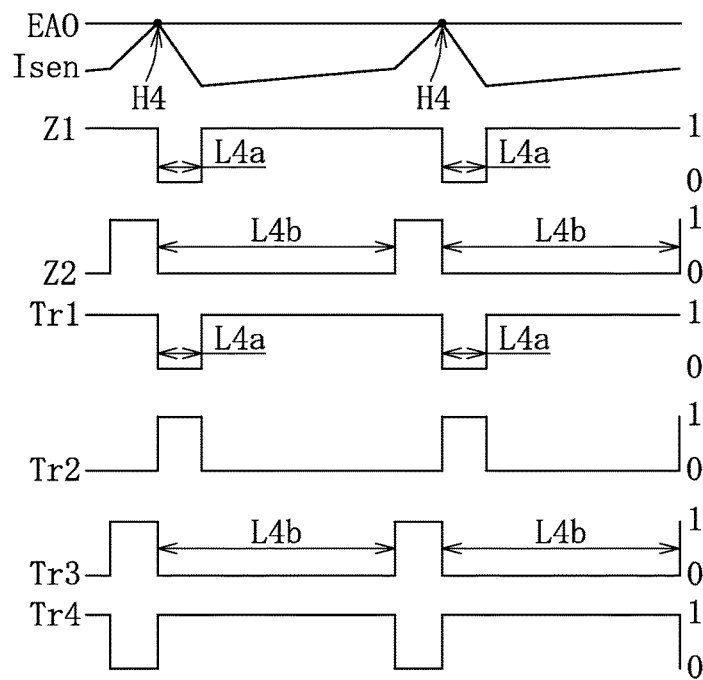

FIG. 5D shows the condition of the control circuit 200 operating in the buck-boost mode and the input voltage Vin being more than the output voltage Vout. Therefore, when the control circuit 200 operates in the buck-boost mode and the input voltage Vin is more than the output voltage Vout, the first controller 230 generates the first signal Z1 with low level for a first predefined time L4a according to the generated start signal St (i.e., when the current signal Isen is higher than the compensation signal EAO, e.g., two ends H4 shown in FIG. 5D). Then the first controller 230 generates the first signal Z1 with high level after the first predefined time L4a. Similarly, the second controller 240 generates the second signal Z2 with low level for a second predefined time L4b according to the generated start signal St. Then the second controller 240 generates the second signal Z2 with high level after the second predefined time L4b.

Next, the driving element 260 generates the switching signal Tr1 with low level and the switching signal Tr2 with high level for the first predefined time L4a according to the first signal Z1 with low level, so as to turn off the first switch SW1 and turn on the second switch SW2 for the first predefined time L4a. This means that the first switch SW1 and the second switch SW2 are reversely switched. In addition, the driving element 260 generates the switching signal Tr3 with low level and the switching signal Tr4 with high level for the second predefined time L4b according to the second signal S2 with low level, so as to turn off the third switch SW3 and turn on the fourth switch SW4 for the second predefined time L4b. This means that the third switch SW3 and the fourth switch SW4 are reversely switched.

It is worth to note that the first predefined time L4a is less than the second predefined time L4b, and the second predefined time L4b is preferably more than three times as long as the first predefined time L4a. Therefore, during the intersection of the second predefined time L4b and the first predefined time L4a, the first switch SW1 and the third switch SW3 are turned off, and the second switch SW2 and the fourth switch SW4 are turned on, so that the current signal Isen decreases quickly because the voltage difference between the first end a1 and the second end b1 of the inductor L becomes greater (i.e., the voltage difference is the output voltage Vout).

During the second predefined time L4b and after finishing the first predefined time L4a, the first switch SW1 and the fourth switch SW4 are turned on, and the second switch SW2 and the third switch SW3 are turned off. At this time, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen increases gradually.

After finishing the second predefined time L4b and the first predefined time L4a, the first switch SW1 and the third switch SW3 are turned on, and the second switch SW2 and the fourth switch SW4 are turned off. At present, because the voltage difference between the first end a1 and the second end b1 of the inductor L becomes greater (i.e., the voltage difference is the input voltage Vin), the current signal Isen increases quickly until the current signal Isen is higher than the compensation signal EAO. After the current signal Isen is higher than the compensation signal EAO, the turned-on and turned-off conditions among the first switch SW1, the second switch SW2, the third switch SW3, and the fourth switch SW4 return to the intersection period of the first predefined time L4a and the second predefined time L4b, to decrease the current signal Isen again.

As in the aforementioned description, in the buck-boost mode, whether or not the input voltage Vin is more than, equal to, or less than the output voltage Vout, the first controller 230 and the second controller 240 of the control circuit 200 respectively generate the first signal Z1 for the first predefined time (e.g., the first predefined time L3a shown in FIG. 5C and the first predefined time L4a shown in FIG. 5D) and the second signal Z2 for the second predefined time (e.g., the second predefined time L3b shown in FIG. 5C and the second predefined time L4b shown in FIG. 5D) according to the start signal St. The first predefined time is less than the second predefined time, so that the turned-off times of the first switch SW1 and the third switch SW3 are different. Therefore, when the current signal Isen flowing through the inductor L is too high (i.e., the current signal Isen is higher than the compensation signal EAO), the control circuit 200 switches the turned-on and turned-off conditions among the first switch SW1, the second switch SW2, the third switch SW3, and the fourth switch SW4. Therefore, the current signal Isen quickly decreases (i.e., during the intersection of the first predefined time and the second predefined time). Then the current signal Isen gradually increases or decreases according to the voltage difference between the input voltage Vin and the output voltage Vout (i.e., during the second predefined time and after finishing the first predefined time). Lastly, the current signal Isen quickly increases until the current signal Isen is higher than the compensation signal EAO (i.e., after finishing the second predefined time and the first predefined time).

Accordingly, the control circuit 200 can generate the fixed turned-off times in the buck mode and the boost mode, and can generate the different turned-off times in the buck-boost mode. Therefore, in the process of switching the four switches, the control circuit 200 has a longer time (i.e., during the second predefined time and after finishing the first predefined time) to gradually charge or discharge the inductor, so that the four switches need not to be turned on or turned off frequently. Therefore, the four switches do not generate much switch noise and switching loss.

Figure 6:
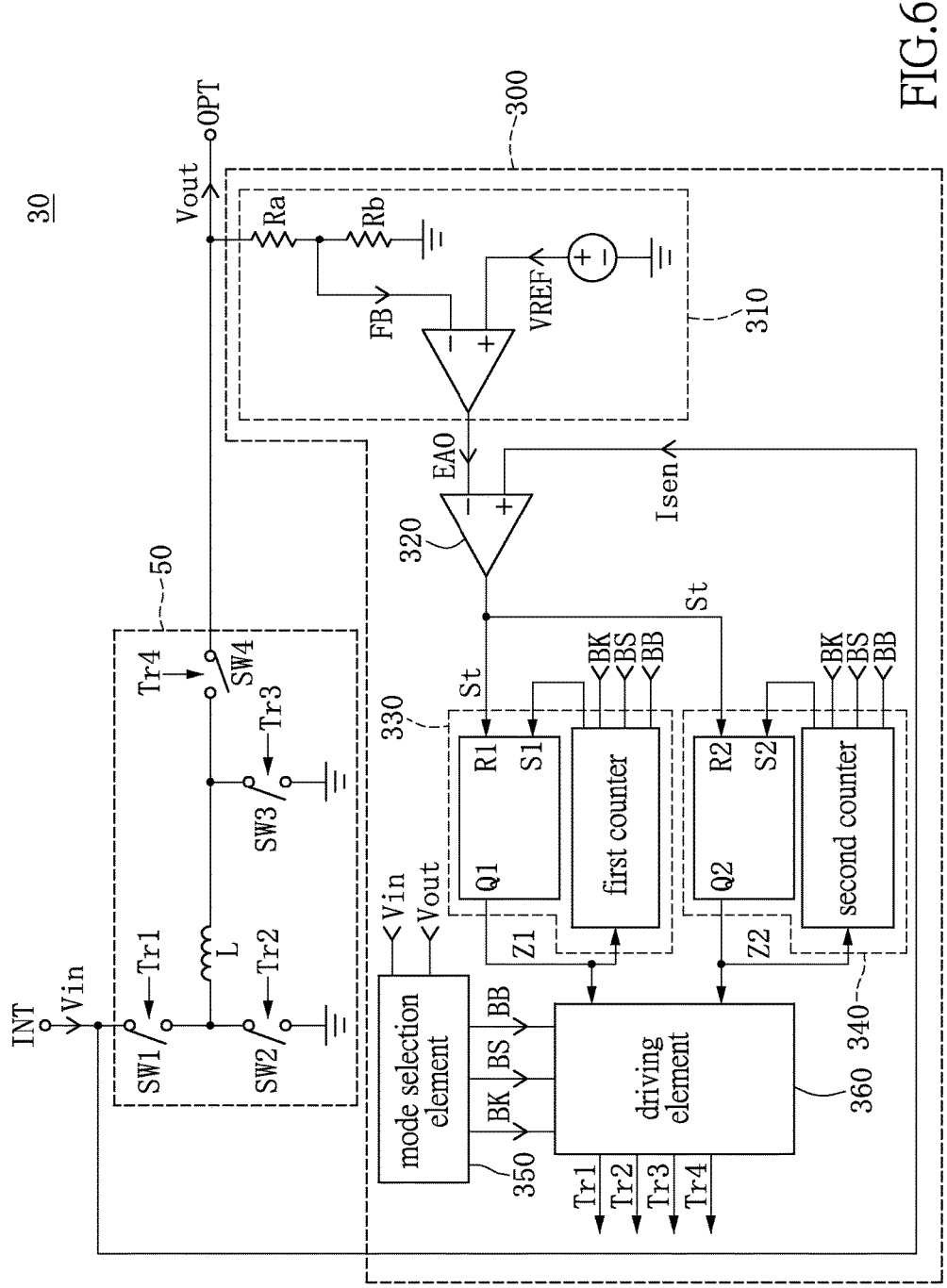
FIG. 6 shows a block diagram of a control circuit according to another exemplary embodiment of the instant disclosure.

Next, please refer to FIG. 6, which shows a block diagram of a control circuit according to another exemplary embodiment of the instant disclosure. The buck-boost converter 30 includes a switching regulator 50 and a control circuit 300. The control circuit 300 includes a feedback compensator 310, a determining element 320, a first controller 330, a second controller 340, a mode selection element 350, and a driving element 360. With respect to internal components and operations of the feedback compensator 310, the first controller 330, the second controller 340, the mode selection element 350, and the driving element 360 are the same as that of the feedback compensator 210, the first controller 230, the second controller 240, the mode selection element 250, and the driving element 260, so detailed description is omitted.

The difference between the instant embodiment and the aforementioned embodiment is that the determining element 320 electrically connects between the input end INT and the first switch SW1, to detect the current signal Isen flowing through the inductor L. Please refer to 7A-7D in conjunction with FIG. 6. FIGS. 7A-7D show a wave diagram of the current signal and the switching signals being in the buck mode, the boost mode, or the buck-boost mode.

Compared with the determining element 220 connecting between the inductor L and the fourth switch SW4, the determining element 320 is electrically connected between the input end INT and the first switch SW1. Therefore, when the driving element 360 generates the switching signal Tr2 with high level and the switching signal Tr4 with high level according to the first signal Z1 and the second signal Z2 to turn on the second switch SW2 and the fourth switch SW4, the determining element 320 cannot detect the current signal Isen, so that the current signal Isen goes down to 0. The determining element 320 and the determining element 220 are respectively connected to the different place, so that the determining element 320 and the determining element 220 detect the different current signal Isen, but the control circuit 300 of the instant embodiment and the control circuit 200 of the aforementioned exemplary operate with the same determination mechanism. Therefore, the waveform of the first signal Z1, the second signal Z2, and the switching signals Tr1-Tr4 shown in FIGS. 7A-7D and the waveform of the first signal Z1, the second signal Z2, and the switching signals Tr1-Tr4 shown in FIGS. 5A-5D are same. The persons of ordinary skill in this technology field should infer FIGS. 7A-7D according to FIGS. 5A-5D, so detailed description is omitted.

Figure 7A:
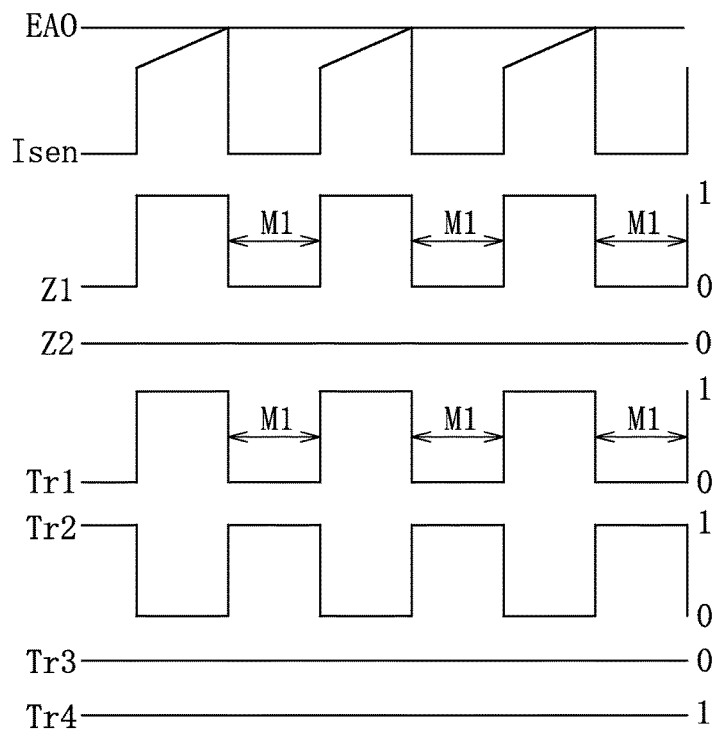
FIGS. 7A-7D show a wave diagram of a control circuit according to another exemplary embodiment of the instant disclosure.

Therefore, as shown in FIG. 7A, the control circuit 300 operates in the buck mode. During the fixed time M1, the first switch SW1 and the third switch SW3 are turned off, and the second switch SW2 and the fourth switch SW4 are turned on, so as to gradually decrease the current signal Isen. After the fixed time M1, the first switch SW1 and the fourth switch SW4 are turned on, and the second switch SW2 and the third switch SW3 are turned off, so as to gradually increase the current signal Isen. Accordingly, the buck-boost converter 30 can supply the enough current signal Isen in the buck mode, to convert the input voltage Vin into the required output voltage Vout.

Figure 7B:
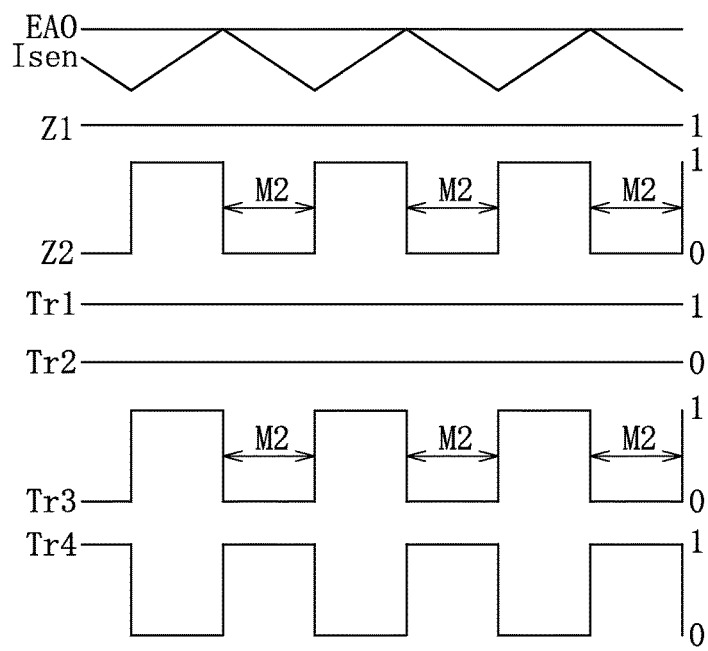

As shown in FIG. 7B, the control circuit 300 operates in the boost mode. During the fixed time M2, the first switch SW1 and the fourth switch SW4 are turned on, and the second switch SW2 and the third switch SW3 are turned off, so as to gradually decrease the current signal Isen. After the fixed time M2, the second switch SW2 and the fourth switch SW4 are turned off, and the first switch SW1 and the third switch SW3 are turned on, so as to gradually increase the current signal Isen. Accordingly, the buck-boost converter 30 can supply enough current signal Isen in the boost mode, to convert the input voltage Vin into the required output voltage Vout.

Figure 7C:
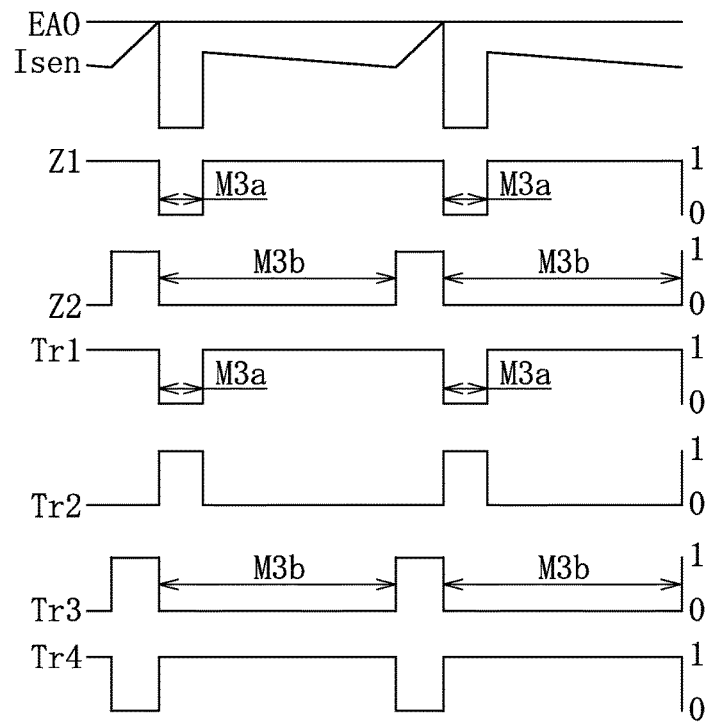

As shown in FIG. 7C, the control circuit 300 operates in the buck-boost mode and the input voltage Vin is less than the output voltage Vout. During the intersection of the second predefined time M3b and the first predefined time M3a, the second switch SW2 and the fourth switch SW4 are turned on, and the first switch SW1 and the third switch SW3 are turned off, so that the current signal Isen decreases quickly because the voltage difference between the first end a1 and the second end b1 of the inductor L becomes greater (i.e., the voltage difference is the output voltage Vout).

During the second predefined time M3b and after finishing the first predefined time M3a, the first switch SW1 and the fourth switch SW4 are turned on, and the second switch SW2 and the third switch SW3 are turned off. At this time, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen decreases gradually.

After finishing the second predefined time M3b and the first predefined time M3a, the first switch SW1 and the third switch SW3 are turned on, and the second switch SW2 and the fourth switch SW4 are turned off. At present, because the voltage difference between the first end a1 and the second end b1 of the inductor L becomes greater (i.e., the voltage difference is the input voltage Vout), the current signal Isen increases quickly until the current signal Isen is higher than the compensation signal EAO. After the current signal Isen is higher than the compensation signal EAO, the turned-on and turned-off conditions among the first switch SW1, the second switch SW2, the third switch SW3, and the fourth switch SW4 return to the intersection period of the second predefined time M3b and the first predefined time M3a, to decrease the current signal Isen again.

Figure 7D:
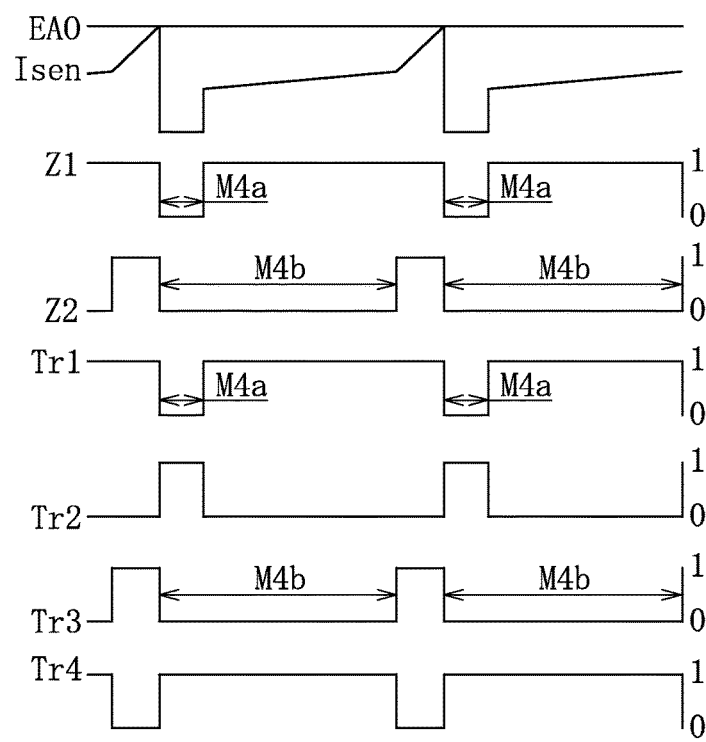

As shown in FIG. 7D, the control circuit 300 operates in the buck-boost mode and the input voltage Vin is more than the output voltage Vout. During the intersection of the second predefined time M4b and the first predefined time M4a, the first switch SW1 and the third switch SW3 are turned off, and the second switch SW2 and the fourth switch SW4 are turned on, so that the current signal Isen decreases quickly because the voltage difference between the first end a1 and the second end b1 of the inductor L becomes greater (i.e., the voltage difference is the output voltage Vout).

During the second predefined time M4b and after finishing the first predefined time M4a, the first switch SW1 and the fourth switch SW4 are turned on, and the second switch SW2 and the third switch SW3 are turned off. At this time, because the input voltage Vin is close to the output voltage Vout, the voltage difference between the first end a1 and the second end b1 of the inductor L becomes smaller (i.e., the voltage difference is the input voltage Vin minus the output voltage Vout), so that the current signal Isen increases gradually.

After finishing the second predefined time M4b and the first predefined time M4a, the first switch SW1 and the third switch SW3 are turned on, and the second switch SW2 and the fourth switch SW4 are turned off. At present, because the voltage difference between the first end a1 and the second end b1 of the inductor L becomes greater (i.e., the voltage difference is the input voltage Vin), the current signal Isen increases quickly until the current signal Isen is higher than the compensation signal EAO. After the current signal Isen is higher than the compensation signal EAO, the turned-on and turned-off conditions among the first switch SW1, the second switch SW2, the third switch SW3, and the fourth switch SW4 return to the intersection period of the first predefined time M4a and the second predefined time M4b, to decrease the current signal Isen again.

Accordingly, the determining element 320 of the control circuit 300 can be electrically connected between the input end INT and the first switch SW1, to detect the current signal Isen. The control circuit 300 can generate the fixed turned-off times in the buck mode and the boost mode, and can generate the different turned-off times in the buck-boost mode. Therefore, in the process of switching the four switches, the control circuit 300 has a longer time (i.e., during the second predefined time and after finishing the first predefined time) to gradually charge or discharge the inductor, so that the four switches need not to be turned on or turned off frequently. Therefore, the four switches do not generate much switch noise and switching loss.

In summary, the invention provides a buck-boost converter and a control circuit thereof. When the input voltage is close to the output voltage (i.e., the buck-boost converter operates in a buck-boost mode), the control circuit generates specific switching signals. Four switches of the switching regulator are switched by the switching signals, so that the four switches are not turned-on or turned-off frequently because of the input voltage closing to the output voltage. Accordingly, the buck-boost converter and the control circuit thereof can reduce switch noise of the four switches and switching loss of the whole circuit, to improve conversion efficiency of the buck-boost converter.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A control circuit, used for controlling a switching regulator of a buck-boost converter, the switching regulator having an inductor, a first switch, a second switch, a third switch, and a fourth switch, the inductor having a first end and a second end, an end of the first switch coupled to the first end, another end of the first switch configured for receiving an input voltage generated from an input end, an end of the second switch coupled to the first end, another end of the second switch coupled to ground, an end of the third switch coupled to the second end, another end of the third switch coupled to ground, an end of the fourth switch coupled to the second end, and another end of the fourth switch configured for transmitting an output voltage to an output end, the control circuit comprising:

a feedback compensator, coupled between the fourth switch and the output end, configured for detecting the output voltage, and generating a compensation signal indicating the output voltage;

a determining element, coupled to the feedback compensator, configured for receiving the compensation signal and a current signal flowing through the inductor, and determining whether the current signal is lower than the compensation signal, wherein when the current signal is lower than the compensation signal, the determining element generates a start signal;

a mode selection element, configured for receiving the input voltage and the output voltage, wherein when a voltage difference between the input voltage and the output voltage is less than or equal to a predefined voltage, the mode selection element generates a buck-boost mode;

a first controller, coupled to the determining element and the mode selection element, configured for generating a first signal with high level for a first predefined time according to the start signal in the buck-boost mode, and generating the first signal with low level after the first predefined time;

a second controller, coupled to the determining element and the mode selection element, configured for generating a second signal with high level for a second predefined time according to the start signal in the buck-boost mode, and generating the second signal with low level after the second predefined time, wherein the first predefined time is more than the second predefined time; and a driving element, coupled to the mode selection element, the first controller, and the second controller, configured for turning on the first switch according to the first signal with high level and turning off the first switch according to the first signal with low level in the buck-boost mode, and configured for turning on the third switch according to the second signal with high level and turning off the third switch according to the second signal with low level in the buck-boost mode, wherein the first switch and the second switch are reversely switched, and the third switch and the fourth switch are reversely switched.

2. The control circuit according to claim 1, wherein the determining element is a comparator, the comparator has an input positive end and an input negative end, the input positive end receives the compensation signal, the input negative end receives the current signal, and the comparator compares the compensation signal with the current signal to generate the start signal when the current signal is lower than the compensation signal.

3. The control circuit according to claim 1, wherein the feedback compensator comprises a first resistor, a second resistor, and an operational amplifier (OPA), an end of the first resistor electrically connects to the output end, another end of the first resistor electrically connects to an end of the second resistor, another end of the second resistor connects to ground, a negative end of the OPA electrically connects between the first resistor and the second resistor to receive a feedback signal according to the output voltage, a positive end of the OPA electrically connects a voltage source to receive a reference voltage generated from the voltage source, and the OPA generates the compensation signal indicating the output voltage according to the feedback signal and the reference voltage.

4. The control circuit according to claim 1, wherein the first controller comprises:

a first SR flip-flop, having a first set end, a first reset end, and a first output end, the first set end receiving the start signal, and the first output end generating the first signal with high level according to the start signal; and a first counter, electrically connected among the driving element, the mode selection element, and the first reset end, wherein when the first counter determines that the first signal is in the positive edge trigger, counts the first predefined time, and resets the first signal after the first predefined time, to generate the first signal with low level.

5. The control circuit according to claim 4, wherein the second controller comprises:

a second SR flip-flop, having a second set end, a second reset end, and a second output end, the second set end receiving the start signal, and the second output end generating the second signal with high level according to the start signal; and a second counter, electrically connected among the driving element, the mode selection element, and the second reset end, wherein when the second counter determines that the second signal is in the positive edge trigger, counts the second predefined time, and resets the second signal after the second predefined time, to generate the second signal with low level.

6. The control circuit according to claim 1, wherein when the input voltage is more than the output voltage and the voltage difference is more than the predefined voltage, the mode selection element generates a buck mode, wherein the driving element turns on the first switch according to the first signal with high level, turns off the first switch according to the first signal with low level, and keeps turning off the third switch in the buck mode, wherein the first switch and the second switch are reversely switched, and the third switch and the fourth switch are reversely switched.

7. The control circuit according to claim 1, wherein when the input voltage is less than the output voltage and the voltage difference is more than the predefined voltage, the mode selection element generates a boost mode, the driving element turns on the third switch according to the second signal with high level, turns off the third switch according to the second signal with low level, and keeps turning on the first switch in the boost mode, wherein the first switch and the second switch are reversely switched, and the third switch and the fourth switch are reversely switched.

8. The control circuit according to claim 1, wherein the determining element electrically connects between the inductor and the fourth switch, to detect the current signal flowing through the inductor.

9. A buck-boost converter, comprising:

a switching regulator, comprising:

an inductor, having a first end and a second end;

a first switch, an end of the first switch coupled to the first end, and another end of the first switch configured for receiving an input voltage generated from an input end;

a second switch, an end of the second switch coupled to the first end, and another end of the second switch coupled to ground;

a third switch, an end of the third switch coupled to the second end, and another end of the third switch coupled to ground;

a fourth switch, an end of the fourth switch coupled to the second end, and another end of the fourth switch configured for transmitting an output voltage to an output end;

a control circuit, coupled to the switching regulator and used for controlling the switching regulator, to convert the input voltage into the output voltage, the control circuit comprising:

a feedback compensator, coupled between the fourth switch and the output end, configured for detecting the output voltage, and generating a compensation signal indicating the output voltage;

a determining element, coupled to the feedback compensator, configured for receiving the compensation signal and a current signal flowing through the inductor, and determining whether the current signal is lower than the compensation signal, wherein when the current signal is lower than the compensation signal, the determining element generates a start signal;

a mode selection element, configured for receiving the input voltage and the output voltage, wherein when a voltage difference between the input voltage and the output voltage is less than or equal to a predefined voltage, the mode selection element generates a buck-boost mode;

a first controller, coupled to the determining element and the mode selection element, configured for generating a first signal with high level for a first predefined time according to the start signal in the buck-boost mode, and generating the first signal with low level after the first predefined time;

a second controller, coupled to the determining element and the mode selection element, configured for generating a second signal with high level for a second predefined time according to the start signal in the buck-boost mode, and generating the second signal with low level after the second predefined time, wherein the first predefined time is more than the second predefined time; and a driving element, coupled to the mode selection element, the first controller, and the second controller, configured for turning on the first switch according to the first signal with high level and turning off the first switch according to the first signal with low level in the buck-boost mode, and configured for turning on the third switch according to the second signal with high level and turning off the third switch according to the second signal with low level in the buck-boost mode, wherein the first switch and the second switch are reversely switched, and the third switch and the fourth switch are reversely switched.

10. The buck-boost converter according to claim 9, wherein the first controller comprises:

a first SR flip-flop, having a first set end, a first reset end, and a first output end, the first set end receiving the start signal, and the first output end generating the first signal with high level according to the start signal; and a first counter, electrically connected among the driving element, the mode selection element, and the first reset end, wherein when the first counter determines that the first signal is in the positive edge trigger, counts the first predefined time, and resets the first signal after the first predefined time, to generate the first signal with low level.

11. The buck-boost converter according to claim 10, wherein the second controller comprises:

a second SR flip-flop, having a second set end, a second reset end, and a second output end, the second set end receiving the start signal, and the second output end generating the second signal with high level according to the start signal; and a second counter, electrically connected among the driving element, the mode selection element, and the second reset end, wherein when the second counter determines that the second signal is in the positive edge trigger, counts the second predefined time, and resets the second signal after the second predefined time, to generate the second signal with low level.

12. A control circuit, used for controlling a switching regulator of a bust-boost converter, the switching regulator having an inductor, a first switch, a second switch, a third switch, and a fourth switch, the inductor having a first end and a second end, an end of the first switch coupled to the first end, another end of the first switch configured for receiving an input voltage generated from an input end, an end of the second switch coupled to the first end, another end of the second switch coupled to ground, an end of the third switch coupled to the second end, another end of the third switch coupled to ground, an end of the fourth switch coupled to the second end, and another end of the fourth switch configured for transmitting an output voltage to an output end, the control circuit comprising:

a feedback compensator, coupled between the fourth switch and the output end, configured for detecting the output voltage, and generating a compensation signal indicating the output voltage;

a determining element, coupled to the feedback compensator, configured for receiving the compensation signal and a current signal flowing through the inductor, and determining whether the current signal is higher than the compensation signal, wherein when the current signal is higher than the compensation signal, the determining element generates a start signal;

a mode selection element, configured for receiving the input voltage and the output voltage, wherein when a voltage difference between the input voltage and the output voltage is less than or equal to a predefined voltage, the mode selection element generates a buck-boost mode;

a first controller, coupled to the determining element and the mode selection element, configured for generating a first signal with low level for a first predefined time according to the start signal in the buck-boost mode, and generating the first signal with high level after the first predefined time;

a second controller, coupled to the determining element and the mode selection element, configured for generating a second signal with low level for a second predefined time according to the start signal in the buck-boost mode, and generating the second signal with high level after the second predefined time, wherein the first predefined time is less than the second predefined time; and a driving element, coupled to the mode selection element, the first controller, and the second controller, configured for turning off the first switch according to the first signal with low level and turning on the first switch according to the first signal with high level in the buck-boost mode, and configured for turning off the third switch according to the second signal with low level and turning on the third switch according to the second signal with high level in the buck-boost mode, wherein the first switch and the second switch are reversely switched, and the third switch and the fourth switch are reversely switched.

13. The control circuit according to claim 12, wherein the determining element is a comparator, the comparator has an input positive end and an input negative end, the input positive end receives the current signal, the input negative end receives the compensation signal, and the comparator compares the current signal with the compensation signal to generate the start signal when the current signal is higher than the compensation signal.

14. The control circuit according to claim 12, wherein the feedback compensator comprises a first resistor, a second resistor, and an operational amplifier (OPA), an end of the first resistor electrically connects to the output end, another end of the first resistor electrically connects to an end of the second resistor, another end of the second resistor connects to ground, a negative end of the OPA electrically connects between the first resistor and the second resistor to receive a feedback signal according to the output voltage, a positive end of the OPA electrically connects a voltage source to receive a reference voltage generated from the voltage source, and the OPA generates the compensation signal indicating the output voltage according to the feedback signal and the reference voltage.

15. The control circuit according to claim 12, wherein the first controller comprises:
a first SR flip-flop, having a first reset end, a first set end, and a first output end, the first reset end receiving the start signal, and the first output end generating the first signal with low level according to the start signal; and
a first counter, electrically connected among the driving element, the mode selection element, and the first set end, wherein when the first counter determines that the first signal is in the negative edge trigger, counts the first predefined time, and sets the first signal after the first predefined time, to generate the first signal with high level.

16. The control circuit according to claim 15, wherein the second controller comprises:
a second SR flip-flop, having a second reset end, a second set end, and a second output end, the second reset end receiving the start signal, and the second output end generating the second signal with low level according to the start signal; and
a second counter, electrically connected among the driving element, the mode selection element, and the second set end, wherein when the second counter determines that the second signal is in the negative edge trigger, counts the second predefined time, and sets the second signal after the second predefined time, to generate the second signal with high level.

17. The control circuit according to claim 12, wherein when the input voltage is more than the output voltage and the voltage difference is more than the predefined voltage, the mode selection element generates a buck mode, wherein the driving element turns off the first switch according to the first signal with low level, turns on the first switch according to the first signal with high level, and keeps turning off the third switch in the buck mode, wherein the first switch and the second switch are reversely switched, and the third switch and the fourth switch are reversely switched.

18. The control circuit according to claim 12, wherein when the input voltage is less than the output voltage and the voltage difference is more than the predefined voltage, the mode selection element generates a boost mode, the driving element turns off the third switch according to the second signal with low level, turns on the third switch according to the second signal with high level, and keeps turning on the first switch in the boost mode, wherein the first switch and the second switch are reversely switched, and the third switch and the fourth switch are reversely switched.

19. The control circuit according to claim 12, wherein the determining element electrically connects between the inductor and the fourth switch, or electrically connects between the input end and the first switch, to detect the current signal flowing through the inductor.

* * * * *